United States Patent

Simpson

[15] 3,689,494

[45] Sept. 5, 1972

[54] N-PYRIDINEALKYL-ALKANOLAMINE NITRATES

[72] Inventor: William R. J. Simpson, 269 River Road, Hanover, N.J. 07936

[22] Filed: March 31, 1971

[21] Appl. No.: 129,998

Related U.S. Application Data

[63] Continuation-in-part of Ser. No. 124,490, March 15, 1971.

[52] U.S. Cl......260/296 R, 260/295 R, 260/295.5 R, 260/295 AM, 260/295.5 A, 424/263
[51] Int. Cl. .............................................C07d 31/42
[58] Field of Search ..................................260/296 R

[56] References Cited

UNITED STATES PATENTS 3,096,336   7/1963   Ferguson ............260/295.5 R

*Primary Examiner*—Alan L. Rotman
*Attorney*—Gerald D. Sharkin, Thomas C. Doyle, Robert S. Honor, Walter F. Jewell, Thomas O. McGovern, Richard E. Vila and Frederick H. Weinfeldt

[57] ABSTRACT

Nitrate esters of N-pyridinealkyl-alkanolamines, e.g., 2,2'-(2-{α-pyridine-ethyl}-imino) diethanol dinitrate, are prepared by nitrating N-pyridinealkyl-alkanolamines and are useful as anti-anginal agents.

3 Claims, No Drawings

N-PYRIDINEALKYL-ALKANOLAMINE NITRATES

This application is a continuation in part of copending application, Ser. No. 124,490, filed Mar 15, 1971.

This invention relates to nitrate esters of pyridine derivatives. In particular, this invention concerns nitrate esters of pyridine substituted alkanolamines, processes and intermediates used in their preparation and their use in the treatment of angina pectoris.

The compounds of this invention may be represented by the following structural formula:

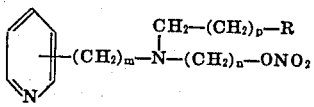

(I)

Where

R represents hydrogen, $-CH_3$ or $-CH_2ONO_2$
$m$ is an integer between 1 and 6;
$n$ is an integer between 2 and 6 and
$p$ is an integer between 0 and 4, or pharmaceutically acceptable acid addition salts thereof.

The preferred compounds of formula (I) are those in which R is $-CH_2-ONO_2$, $p$ is 0 and both $m$ and $n$ are 2.

The process for preparing the compounds of formula (I) may be represented by the following reaction scheme:

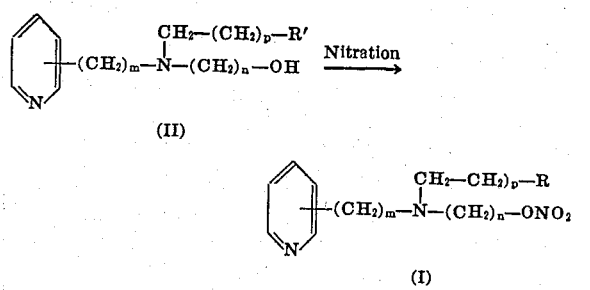

where R' is hydrogen, $-CH_3$ or $-CH_2OH$ and R, $m$, $n$, and $p$ are as defined as above.

The compounds of formula (I) are prepared by nitration of the compounds of formula (II) to the corresponding nitrate ester. The nitration is carried out with conventional nitrating agents, e.g., fuming or concentrated nitric acid, preferably a mixture of nitric acid or metal nitrate and a carboxylic acid anhydride having 3 to 8 carbon atoms, especially acetic anhydride. It is preferred that the reaction be carried out at temperatures between about $-70°$ to $50° C$., especially at about $-15°$ to $20° C$. The reaction is also preferably carried out in excess reagent, especially excess carboxylic acid anhydride or a mixture of carboxylic acid anhydride and nitric acid. If desired, an inert organic solvent, in particular acetic acid, may be used. The nitrating agent, the temperature and the particular solvent used are not critical. The compounds of formula (I) are recovered by conventional techniques, e.g., chromatography and evaporation.

The compounds of formula (II) are novel and are prepared in accordance with the following reaction scheme:

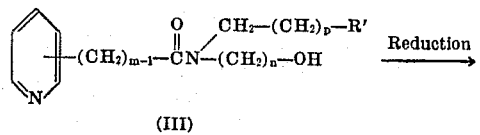

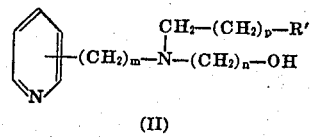

(II)

where R', $m$, $n$, and $p$ are as defined above.

The compounds of formula (II) are prepared by reducing the compounds of formula (III) in an inert solvent with a metal hydride reducing agent. The particular hydride used is not critical and include lithium aluminum hydride, sodium aluminum hydride, diborane and the like. The preferred reducing agent is diborane. The inert solvents are non-hydroxylic and include dioxane, glyme, diglyme and ethers such as tetrahydrofuran, diethyl ether etc. The particular solvent used is not critical, but tetrahydrofuran and glyme are preferred. The temperature at which the reaction is carried out also is not critical, but the preferred temperature range is $10°$ to $80°C$. and in particular, $20°$ to $40°C$. The product is recovered by conventional methods, e.g., by destroying the residual reducing agent with dilute mineral acid and isolating the product by evaporation and distillation.

The compound of formula (III) are novel and represent another aspect of the invention. These compounds are prepared according to the following reaction scheme.

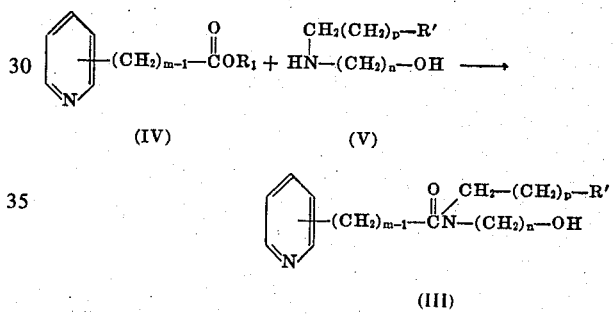

where R', $m$, $n$ and $p$ are as defined above and $R_1$ is methyl or ethyl.

Compounds (III) are prepared by treating a compound of Formula (IV) with an alkanolamine of formula (V). Although a solvent is not necessary, it is preferred that the reaction be carried out in an inert solvent, such as dioxane, lower alkanols, e.g., methanol, ethanol, etc., ethers, such as tetrahydrofuran and the like, glyme, diglyme, or in an excess of alkanolamine (V). The particular solvent used is not critical, but glyme and diglyme are preferred. The temperature at which the reaction is carried out also is not critical, but it is preferred that the reaction be run at temperatures between about $35°$ to $200° C$., preferably $100°$ to $150° C$. The product is recovered by conventional techniques, e.g., evaporation, and distillation.

The compounds of formula (II) in which $m$ is 2 may also be prepared according to the following procedure:

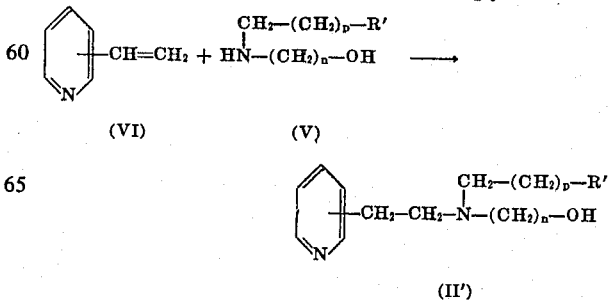

where R′, n, and p are as defined above.

The compounds of formula (II′) are prepared by treating vinyl pyridine with an alkanolamine of formula (V). Although not essential, it is preferred that the reaction be conducted in the presence of an inorganic or organic acid catalyst, preferably hydrochloric acid. A solvent is not necessary but it is preferred that the reaction be carried out in excess reagent or in an inert polar solvent, e.g., lower alkanols, such as methanol, ethanol and the like, acetonitrile, dioxane and etc., especially the lower alkanols. The temperature at which the reaction is carried out is not critical, but it is preferred that the reaction be run at about 50° C to about 150° C especially at the reflux temperature of the medium. Although the time is not critical, for optimum results, it is preferred that the reaction be carried out for a period of about 3 to 24 hours. The product is isolated by conventional techniques e.g., distillation and evaporation.

Certain of the compounds of formula (II) may also be prepared in accordance with the following reaction scheme:

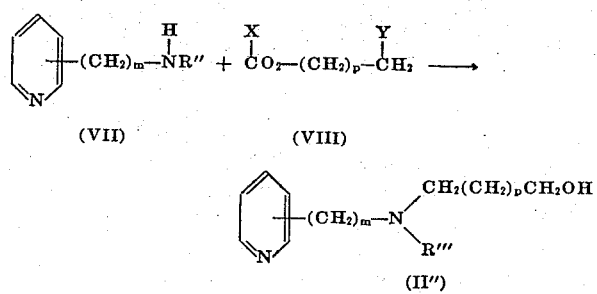

where $m$ is an integer between 1 and 6

$p$ is an integer between 0 and 4

X represents — OH and

Y represents halo having an atomic weight of about 35 to 80 or

X and Y together represent —O—;

R″ represents hydrogen, lower alkyl having 1 to 6 carbon atoms e.g., methyl, ethyl and the like or $(CH_2)_n$ oh and R‴ represents lower alkyl having 1 to 6 carbon atoms or $—(CH_2)_n—OH$ where $n$ is as defined previously, provided $p$ is 0 when X and Y together represent —O—, and R‴ is the same as R″ except when R″ is hydrogen in which case R‴ is $—CH_2—(CH_2)_p—CH_2OH$.

The compounds of Formula (II″) are prepared by treating the compounds of formula (VII) with a compound of formula (VIII). Although a solvent is not necessary, it is preferred that the reaction be carried out in an inert solvent especially the lower alkanols such as methanol, ethanol, and the like. The temperature at which the reaction is carried out also is not critical; but is is preferred that the reaction be run at about 10°C to about 150°C especially between about 50° to 80°C. For optimum results it is desirable to run the reaction for about 2 to 10 hours, preferably 2 to 6 hours, although the time is not critical. The product is recovered by standard techniques, e.g., evaporation or distillation.

The compounds of formula (VI) and (VIII) and many of the compounds of formula (IV), (V), and (VII) are known and may be prepared by processes described in the literature. The compounds of formula (IV), (V), and (VII) not specifically disclosed may be prepared by analogous methods using known starting materials.

As indicated previously, the compounds of formula (I) are useful because they possess pharmacological activity in animals. In particular, the compounds are useful as anti-anginal agents as indicated by an increase in coronary blood flow and by a reduction of myocardial oxygen consumption in an anesthetized dog given 20 milligrams per kilogram of body weight of a compound of formula (I) intravenously.

For such usage, compound (I) may be administered orally or parenterally, as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. These pharmaceutical preparations may contain up to about 90 percent of the active ingredient in combination with the carrier or adjuvant.

Furthermore, these compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, maleate, malate, tartrate, methanesulfonate, cyclohexylsulfamate and the like.

The anti-anginal effective dose of active ingredient employed for the treatment of angina may vary depending on the particular compound employed and the severity of the condition being treated. However, in general, satisfactory results are obtained when the compounds (I) are administered at a daily dosage of from about 0.5 milligram to about 100 milligrams per kilogram of animal body weight, preferably given in divided doses two to four times a day, or in sustained release form. For most large mammals, such as primates, in need of said treatment, the total daily dosage is from about 35 to about 500 milligrams. Dosage forms suitable for internal use comprise from about 9 to about 250 milligrams of the active compound in intimate admixture with a solid or liquid pharmaceutically acceptable carrier or diluent.

The preferred pharmaceutical compositions from the standpoint of preparation and ease of administration are solid compositions, particularly hardfilled capsules and tablets containing about 1 to 25 milligrams of active ingredient.

Tablets and capsules containing the ingredients indicated below may be prepared by conventional techniques and are useful in treating angina pectoris at a dose of one tablet or capsule two to four times a day.

| Ingredients | Weight (mg.) tablet | capsule |
| --- | --- | --- |
| 2,2'-( 2-{α-pyridine ethyl}imino)-dinitrate dihydrochloride | 25 | 25 |
| Tragacanth | 10 | — |
| Lactose | 197.5 | 250 |
| Corn starch | 25 | |
| Talcum | 15 | |
| Magnesium stearate | 2.5 | |

The following pharmaceutical compositions are formulated with the indicated amount of active agent using conventional techniques. The injectable suspension and the oral liquid suspension represents formulations useful as unit doses and may be administered in the treatment of angina pectoris. The injectable suspension is suitable for administration once a day whereas the oral liquid suspension is suitable administered two to four times a day for this purpose:

| | sterile injectable suspension | oral liquid suspension |
| --- | --- | --- |
| 2,2'-( 2-{α pyridine ethyl}imino)-diethanol dinitrate dihydrochloride | 25 | 25 |
| Sodium carboxy methylcellulose U.S.P. | 1.25 | 12.5 |
| Methyl Cellulose | 0.4 | — |
| Polyvinylpyrrolidone | 5 | — |
| Lecithin | 3 | — |
| Benzyl alcohol | 0.01 | — |
| Magnesium aluminum silicate | — | 47.5 |
| Flavor | — | q.s. |
| Color | — | q.s. |
| Methyl paraben, U.S.P. | — | 4.5 |
| Propyl paraben, U.S.P. | — | 1.0 |
| Polysorbate 80 (e.g. Tween 80) U.S.P. | — | |
| Sorbitol solution 70% U.S.P. | — | 2,500 |
| Buffer agent to adjust pH for desired stability | q.s. | q.s. |
| Water | q.s. for injection q.s. to 1 ml. | q.s. to 5 ml. |

EXAMPLE 1

2,2'-(2-{α-pyridine ethyl}imino)diethanol dinitrate dihydrochloride

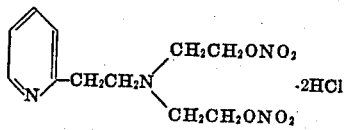

Step A: N,N-di-(β-hydroxyethyl)-2-(αpyridine) acetamide

A mixture of 11 g. of ethyl 2-(α-pyridine) acetate and 11 g. of diethanolamine in 25 ml of glyme is refluxed for 18 hours to yield a solution of N, N di-(β-hydroxyethyl) -2- (α-pyridine) acetamide. Step B: 2,2'( 2-{α-pyridine ethyl}imino)diethanol The above solution is added dropwise over a 10 minute period to a stirred solution of diborane (300 ml. of 1.0 M solution) in tetrahydrofuran. After stirring for 20 hours at room temperature, 100 ml of 1.0N hydrochloric acid is added, and the resultant mixture is refluxed for 2 hours. 150 ml. of 2N sodium bicarbonate solution is added, and following the removal of the solvent in vacuo, the product, 2,2'( 2-{α-pyridine ethanyl} imino)diethanol is recovered by distillation ( b.p. 160°/5 micron).

Step C: 2,2'-(2-{α-pyridine ethyl}imino)diethanol dinitrate dihydrochloride

A solution of 4.1 g. of 2,2'-( 2-{α-pyridine ethyl} imino)diethanol in 7 mls of glacial acetic acid is added dropwise to stirred mixture of 23.6 ml of acetic anhydride and 7.9 ml of 90 percent nitric acid while maintaining the reaction temperature between −5° and −10° C. After stirring for an additional 20 minutes at −5°, the reaction mixture is poured onto ice and excess ammonia solution, following which the mixture is extracted with methylene chloride. The solvent is removed invacuo from the extract and the residue, after dissolving in chloroform, is passed through column of silica gel and eluted with chloroform. The eluent is then heated with a slight excess of a solution of hydrogen chloride in ethanol. Evaporation of the solvent from this solution and trituration with isopropanol, yields the product 2,2'-(2-{α-pyridine ethyl}imino(diethanol dinitrate dihydrochloride (m.p. 112°to 117° C), which is further crystallized from absolute ethanol/ether.

EXAMPLE 2

2,2'-(β-pyridinemethyl imino)diethanol dinitrate dihydrochloride

Step A: 2,2'-(β-pyridinemethyl imino)diethanol

To a solution of 10 gms of β-pyridinemethylamine in 25 ml of ethanol in a pressure reactor is added an excess of ethylene oxide dissolved in ethanol. The mixture is heated to 80°C and stirred for 2 hrs. The solvent and excess ethylene oxides are evaporated off yielding the product, 2,2'(β -pyridinemethyl imino)diethanol.

Step B: 2,2'-(β-pyridinemethyl imino)diethanol dinitrate dihydrochloride

Following the procedure of Step C of example 1, but using an equivalent amount of 2,2'-(β-pyridinemethylimino)diethanol in place of the 2,2'-( 2-{α-pryidine}ethyl)imino)diethanol used therein there is obtained 2,2'-(β-pyridinemethylimino)diethanol dinitrate dihydrochloride.

When an equivalent amount of 4-(α-pyridine) butylamine is used in place of β-pyridinemethylamine in step A of the above process there is obtained before nitration 2,2'-(4-{β-pyridine butyl}imino)diethanol; and when this compound is treated in accordance with the process of Step C of Example 1 - place of the 2,2'-(2-{α-pyridine ethyl}imino)diethanol used therein, there is obtained 2,2'-(4{α-pyridine butyl} imino)diethanol dinitrate dihydrochloride.

EXAMPLE 3

2,2'-(2-{α-pyridine ethyl}imino)diethanol dinitrate dihydrochloride

A solution containing 10.5 g. of 2-vinylpyridine, 10.5 g. of diethanolamine, and 1 ml. of concentrated hydrochloric acid in 25 ml. of ethanol is refluxed for 14 hours, after which the solvent is removed in vacuo and the product 2,2'-( 2-{α-pyridine ethyl}imino)diethanol, is purified by distillation, (b.p. 160°/5 micron).

Following the procedure of step C of example 1 with this product yields 2,2'-( 2-{α-pyridine ethyl} imino)diethanol dinitrate dihydrochloride.

When an equivalent amount of dibutanolamine or methylaminoethanol is used in place of the diethanolmine above, there is obtained respectively before nitration 2-(2-{α-pyridine ethyl}-imino)dibutanol or 2-(2-{α-pyridine ethyl}- methylimino)ethanol; and after treatment of this product in accordance with the procedure of Step C of example 1, there is obtained respectively 2-(2-{α-pyridine ethyl}-imino) dibutanol dinitrate dihydrochloride or 2-(2-{α-pyridine ethyl}-methylimine)ethanol nitrate dihydrochloride.

EXAMPLE 4

2,2'-(2-{α-pyridine ethyl}imino)diethanol dinitrate dihydrochloride

Step A: 2,2'-(2{α-pyridine ethyl}imino)diethanol

To a solution of 12 gms. of N-(2-{α-pyridine ethyl})ethanolamine in 25 ml. of ethanol in a pressure reactor is added an excess of ethylene oxide dissolved in ethanol. The mixture is heated to 80°C and stirred for 2 hrs. The solvent and excess ethylene oxides are evaporated off yeilding the product, 2,2'(2-{α-pyridine ethyl}imino)diethanol.

Step B. 2,2'-(2-{α-pyridine ethyl}imino)diethanol dinitrate dihydrochloride

When the procedure of Step C of example 1 is carried out using the above 2,2'-(2{α-pyridine ethyl}imino)diethanol there is obtained 2,2'-(2{α-pyridine ethyl}imino)diethanol dinitrate dihydrochloride.

EXAMPLE 5

2,2'-(2{α-pyridine ethyl}imino)diethanol dinitrate dihydrochloride

A solution containing 12 gm of N-(2-{α-pyridine ethyl}) ethanolamine 10.5 g. of 2-bromethyl alcohol and 2.9 gms. of sodium hydroxide in 25 ml. of ethanol is refluxed for 14 hours. After filtration, the solvent is removed in vacuo and the product 2,2'-(2-{α-pyridine ethyl}imino)diethanol, is purified by distillation, (b.p. 160°/5 micron).

Following the procedure of step C of example 1 using the above 2,2'-(2-{α-pyridine ethyl}imino)diethanol, there is obtained 2,2'-(2-{α-pyridine ethyl}imino)diethanol dinitrate dihydrochloride.

When an equivalent amount of N-(2-{α-pyridine ethyl})methylamine is used in place of the N-(2-{α-pyridine ethyl})ethanolamine above there is obtained before nitration 2-(2-{α-pyridine ethyl}-methylimino)ethanol; and after treatment of this produce in accordance with the procedure of Step C of example 1, there is obtained 4-( 2-{α-pyridine ethyl})-methylimino)ethanol nitrate dihydrochloride.

EXAMPLE 6

2,2'-( 2{4-pyridine ethyl}imino)diethanol dinitrate dihydrochloride

A solution containing 10.5 g. of 4-vinylpyridine, 10.5 g of diethanolamine, and 1 ml. of concentrated hydrochloric acid in 25 ml. of ethanol is refluxed for 14 hours, after which the solvent is removed in vacuo and the product 2,2'-(2-{-pyridine ethyl}imino)diethanol, is purified by distillation, ( b.p. 160°/5 micron).

Following the procedure of step C of example 1 with this product yields 2,2'-(2-{4-pyridine ethyl}imino)diethanol dinitrate dihydrochloride.

When an equivalent amount of 2-vinyl pyridine and 2-butylaminoethanol is used in place of the 4-vinylpyridine and diethanolamine above, there is obtained before nitration 2-(2-{α-pyridine ethyl}-4-butylimino)ethanol; and after treatment of this product in accordance with the procedure of Step C of example 1, there is obtained 2-(2-(2-{α-pyridine ethyl}-4-butylimino)ethanol nitrate dihydrochloride.

What is claimed is:

1. A compound of the formula:

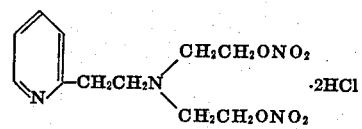

where
R represents hydrogen, —CH₃ or —CH₂ONO₂;
m is an integer between 1 and 6;
n is an integer between 2 and 6; and
p is an integer between 0 and 4 or a pharmaceutically acceptable acid addition salt thereof.

2. The compound of claim 1 which is 2,2'(2-{α-pyridine ethyl}-imino)diethanol-dinitrate.

3. The compound of claim 1 which is 2,2'-(β-pyridine methylimino)diethanol-dinitrate.

UNITED STATES PATENT OFFICE
CERTIFICATE OF CORRECTION

Patent No. 3,689,494      Dated September 5, 1972

Inventor(s) William R. J. Simpson

It is certified that error appears in the above-identified patent and that said Letters Patent are hereby corrected as shown below:

Assignee:    SANDOZ-WANDER, INC.
             Hanover, New Jersey

Column 1 line 3   after the year 1971 insert the words -- now abandoned --.

Column 1 line 34   the formula "$CH_2-CH_2)_p-R$" should read -- $CH_2-(CH_2)_p-R$ --.

Column 3 line 45   the compound "$(CH_2)_n$ oh " should read -- $(CH_2)_n -OH$ --.

Column 8 lines 30 to 35
claim 1 - structure should be

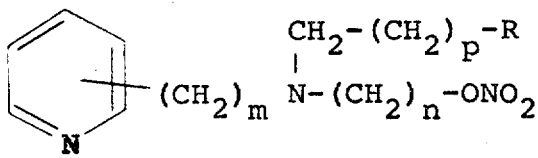

Signed and sealed this 10th day of July 1973.

(SEAL)
Attest:

EDWARD M. FLETCHER, JR.          Rene Tegtmeyer
Attesting Officer                Acting Commissioner of Patents